United States Patent [19]
Wright, Jr.

[11] Patent Number: 4,723,323
[45] Date of Patent: Feb. 9, 1988

[54] CHILD'S ACTIVITY BIB

[76] Inventor: John C. Wright, Jr., 1818 Stanley, Ardmore, Okla. 73401

[21] Appl. No.: 877,335

[22] Filed: Jun. 23, 1986

[51] Int. Cl.⁴ .................. A41D 13/04; G09B 1/00
[52] U.S. Cl. ........................................ 2/49 R; 2/244; 434/395
[58] Field of Search ............... 2/49, 48, 50, 51, 244; 434/99, 176, 395, 405

[56] References Cited

U.S. PATENT DOCUMENTS

| | | | |
|---|---|---|---|
| 2,881,447 | 4/1959 | Shackelford | 2/49 R |
| 3,042,930 | 7/1962 | Martinez | 2/49 R |
| 3,724,101 | 4/1973 | Slezak | 2/75 |

Primary Examiner—Werner H. Schroeder
Attorney, Agent, or Firm—Kanz, Scherback & Timmons

[57] ABSTRACT

An activity bib worn by an adult and presented for interaction by a child facing the adult. The bib includes one or more activity means mounted for use by the child.

10 Claims, 11 Drawing Figures

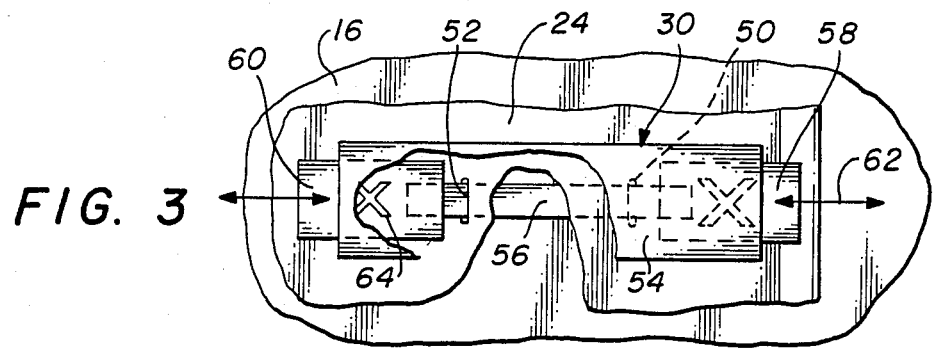
FIG. 3
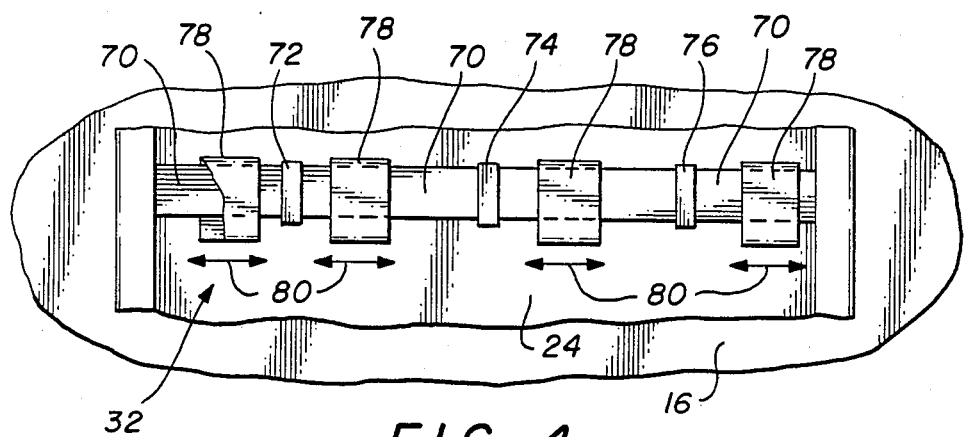
FIG. 4
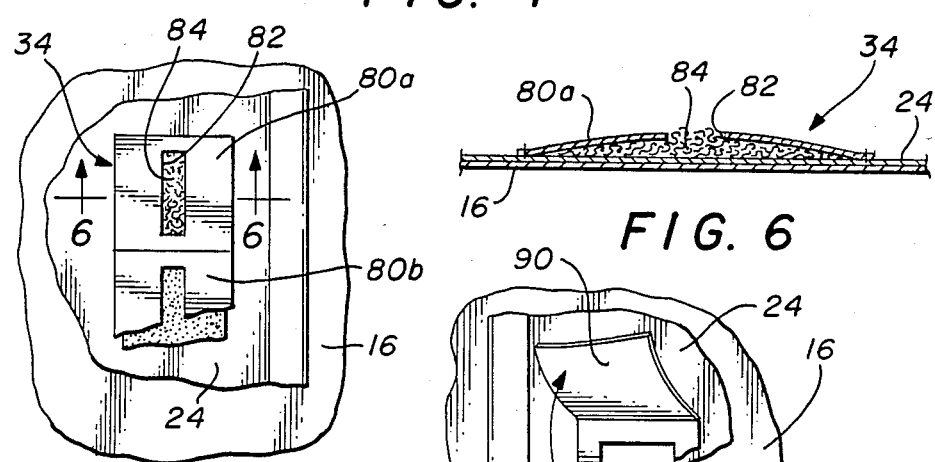
FIG. 5
FIG. 6
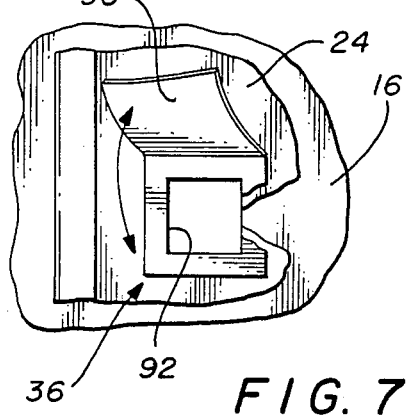
FIG. 7

CHILD'S ACTIVITY BIB

FIELD OF THE INVENTION

This invention relates generally to articles of clothing, and more particularly to articles of clothing adapted for interaction with a child or infant.

BACKGROUND OF THE INVENTION

One of the more important aspects for an adult responsible for the care of a child or infant, is to engage the attention of the child or infant in a constructive manner. For the purposes of this invention, the term "infant" or "child" are synonymous and the term "adult" includes all persons, regardless of age, responsible for the care and safety of a child. This is particularly true when the adult is confined in close quarters with the child for an extended period of time, such as on an airplane, bus, automobile or the like. It is preferable not only to amuse the child, but utilize the child's senses to stimulate mental and physical development. For instance, in such situations, it is common for the child to face the adult while occupying the adult's lap. Hand held devices, such as dolls, books, rattles, etc., may be employed by the adult for interaction with the child, but are undesirable in several respects. Typically, only one or two hand held devices may be utilized at a given time, limiting the range of activities available to the child. Further, the adult may select a device that does not currently interest the child, rendering it ineffective. Control of the devices may be transferred to the child, but it is not uncommon for the child to repeatedly drop the device in an inaccessible or inconvenient location. Finally, it is desirable to free the arms and hands of the adult from holding the devices, particularly for extended periods of time, such as when the adult must also carry or hold the child.

U.S. Pat. No. 3,866,649, issued to Bringmann, shows a shopping cart handle cover having an ornament for amusing a child riding on the shopping cart. U.S. Pat. No. 4,450,219, issued to Klinger, shows an infant seat belt attachment for mounting on a child's safety seat. The attachment includes several stuffed toys releasably secured, such as by Velcro ® type fasteners. The toys may be individually removed and played with by the child. However, these and other similar existing apparatus are designed for use in conjunction with a specific type of structure. The apparatus is thus not generally portable or usable when the supporting structure is not available. Further, the devices shown in the above references are designed to distract or amuse the child, but do not provide apparatus for educating or training the child.

SUMMARY OF THE INVENTION

The present invention provides a child's activity bib which is adapted to be worn by an adult while the child is held on the lap of the adult facing the activity bib. The bib includes one or more activity means for interaction with the child. Preferably, each of the activity means is designed for stimulation of the child's senses in a constructive manner so as to facilitate the child's mental and physical development.

Therefore, it is a principal feature and advantage of this invention to provide an improved child's activity bib.

It is another feature and advantage of this invention to provide an improved child's activity bib that is wearable.

BRIEF DESCRIPTION OF THE DRAWINGS

So that the manner in which the above recited features and advantages of the invention, as well as others which will become apparent to those skilled in the art, are obtained and can be understood in detail, a more particular description of the invention briefly summarized above may be had by reference to the embodiments thereof which are illustrated in the accompanying drawings, which drawings form a part of the specification and in which like numerals depict like parts in the several views. It is noted, however, that the appended drawings illustrate only a preferred embodiment of the invention and are therefore not to be considered limiting of its scope, for the invention may admit to other equally effective embodiments.

FIG. 3 is a magnified view in detail of the tab pull activity means of FIG. 1.

FIG. 4 is a magnified view in detail of the color slide activity means of FIG. 1.

FIG. 5 is a magnified view in detail of texture center activity means of FIG. 1.

FIG. 6 is a cross sectional view of the texture center activity means of FIG. 5 along view 6—6.

FIG. 7 is a magnified view in detail of the digit door activity means of FIG. 1.

DETAILED DESCRIPTION OF THE INVENTION

Figure 1:
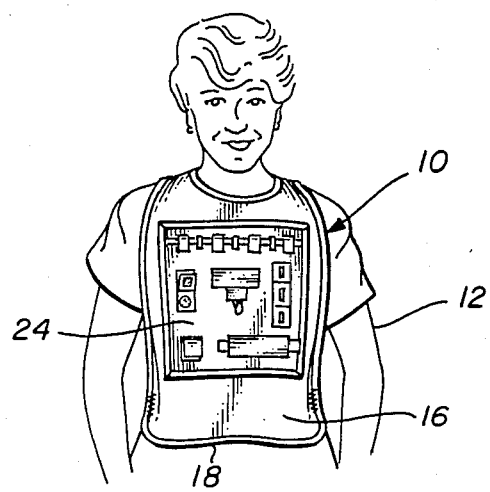
FIG. 1 is a perspective view of an activity bib according to this invention having a plurality of activity means and being worn by an adult.
Figure 2:
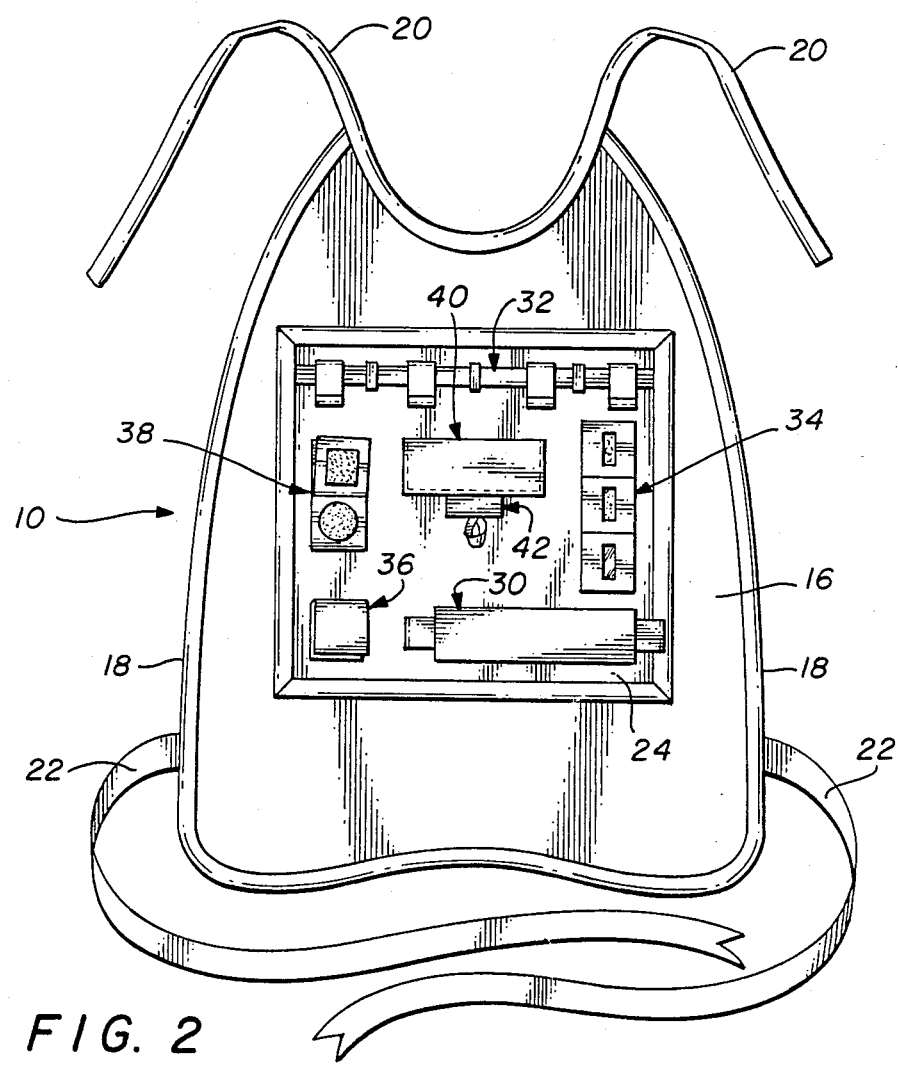
FIG. 2 is a frontal view of the activity bib of FIG. 1.

Referring now to FIGS. 1 and 2, the reference numeral 10 generally indicates the activity bib of this invention. The activity bib is adapted to be worn by adult 12 on the front torso thereof. The activity bib may be preferably constructed of a suitable fabric, but any flexible material, such as plastic, may be employed. The activity bib includes base 16, trim 18, and means for securing the activity bib on the torso of the adult. In the illustrated embodiment, the securing means takes the form of upper and lower strings 20 and 22, respectively. Although not shown in FIG. 1, the strings enable the bib to be secured to the torso of the adult by tying the respective ends of the upper and lower strings together behind the back of the adult. Alternatively, snaps, buckles, flexible fasteners such as Velcro ® or the like may be employed to secure the bib to the adult, with or without either or both of the upper and lower strings.

The bib also includes one or more activity means designed to interact with a child held in front of the adult facing the bib, and specifically sitting on the lap of the adult. In the illustrated embodiment of the invention, the activity means are grouped together, generally in the center of the bib and specifically on an activity pad 24 forming part of the base of the activity bib. Of course, if desired, various activity means could be mounted directly on the base and the activity pad omitted. Preferably, the activity pad is affixed about its edge to the base of the bib, although it is within the scope of this invention to provide an activity pad bearing one or more activity means that is removable from the bib, such as for cleaning or repair or for replacement by another activity pad possibly bearing different activity means. For instance, the activity pad may be secured by releasable Velcro ® fastener strips to the base. This latter embodiment is advantageous in that the activity means may be easily changed as appropriate for children of different ages, abilities or moods, or to change the emphasis of the interaction with the child so as to develop different skills or areas of development of the child.

In the illustrated embodiment of the invention, activity means 30, 32, 34, 36, 38, 40 and 42 are mounted on the activity pad. It is recognized that the number, character, design, size, color, arrangement and distribution of the activity means on the activity pad may be varied as desired or as is found effective in interacting with a child. Tab pull activity means 30 is shown in greater detail in FIG. 3 and includes a pair of aligned openings 50 and 52 in the activity pad. The openings define a sleeve extending between the activity pad and the base of the bib. The openings are enclosed by cover 54. The cover is affixed to the activity pad on its longitudinal edges, but is open on each end edge. Tab 56 is an elongated flexible strip extending through openings 50 and 52 between the sleeve defined by the activity pad and the base of the bib and is sufficient length so that at least one end is accessible through the unattached edges of the cover. Loops 58 and 60 form handles on either end of the tab and have a width greater than that of the openings, so that the tab may not be pulled through the openings. The loops also enable the tab to be grasped at either end for pulling the tab back and forth in lateral direction 62. Preferably, the tab includes attractive indicia 64 on one or both ends which are alternately shifted into view as the tab is pulled back and forth by the child. For the purposes of this application, the term "indicia" includes any writing, marks, symbols, pictures, figures, numbers, drawing or the like, or any combination thereof. Manual manipulation of the tab pull activity means by the child increases his awareness of cause and effect and improves eye-hand coordination.

The color slide activity means 32 is shown in greater detail in FIG. 4 and includes strap 70 affixed at either end to the activity pad. The strap is further divided into multiple segments at various intermediate points 72, 74 and 76 where it is also affixed to the activity pad. Slides 78 encircle the strap, each within one of the segments and each is thus independently slidable over the strap in lateral direction 80 limited by the points of attachment of the strap to the activity pad. Preferably, the various slides are colored in one or more different colors in a manner designed to attract the attention of the child. Manipulation of the color slide activity means reinforces the child's sense of primary and secondary color identification and of movement.

The texture center activity means 34 is shown in greater detail in FIGS. 5 and 6 and include one or more overlays 80a, 80b, etc. Each of the overlays defines a slot 82. A layer of material 84 is enclosed by the overlay, with the portion beneath the slot exposed for manual manipulation. Each of the overlays in the texture center activity means preferably includes a material with a distinctive texture (i.e. smooth, rough, abrasive, fluffy, etc.). Contact by the child with the various textures will incude varying sensations that stimulate the child's sense of touch and texture discrimination.

The digit door activity center 36 is shown in greater detail in FIG. 7 and includes opening 92 extending through the activity pad and base of the bib. Flap 90 is attached to the activity pad along an upper edge. The child may raise the flap, expose the opening and insert his finger into the opening. Manipulation of the digit door activity means by the child will develop and reinforce the child's sense of imagination and play.

Figure 8A:
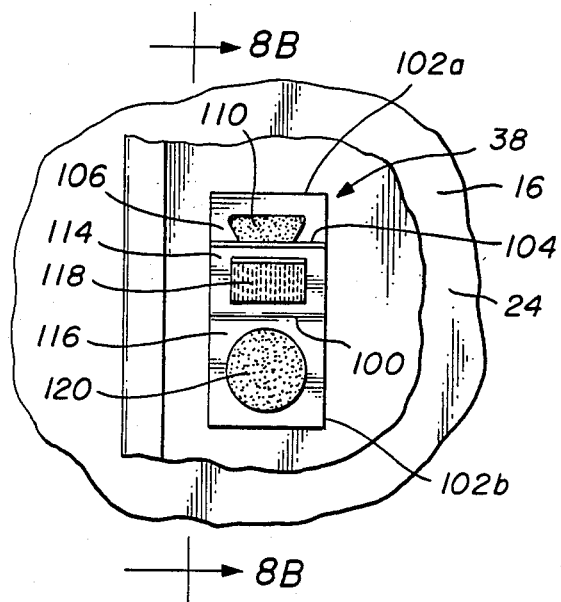
FIG. 8a is a magnified view in detail of the shape tablet activity means of FIG. 1 in an intermediate position.
Figure 8B:
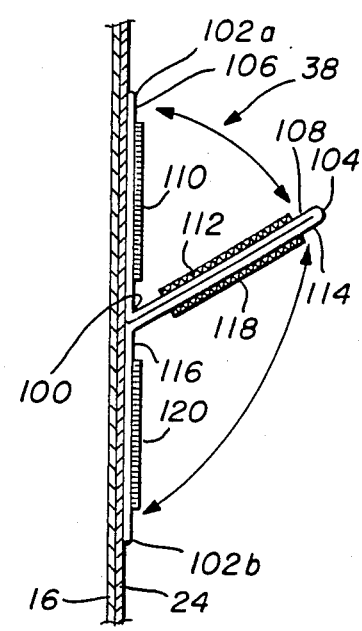
FIG. 8b is a magnified side view, partially in cross section, of the shape tablet activity means of FIG. 8a in an intermediate position.

The shape tablet activity means 38 is shown in greater detail in FIGS. 8a and 8b. The shape tablet activity means includes tablet 100. Table 100 includes at least one portion 102 (shown as portions 102a and 102b in FIGS. 8a and 8b) mounted on the activity pad and another portion 104 connected to the activity pad along one edge at the juncture of the portions 102a and 102b. The facing surfaces 106 and 108, respectively of the portions 102a and 104, each contain mating releasable fastener sections 110 and 112, respectively. The releasable fastener sections may, for instance, be constructed of Velcro ®. Similarly, the opposing surfaces 114 and 116 between the portions 102b and 104 includes releasable fastener sections 118 and 120, respectively. Thus, although illustrated in an intermediate position the portion 104 may be alternately secured to portions 102a or 102b, exposing surfaces 106 and 108; or 114 and 116, respectively, and the releasable fastener sections mounted thereon. As is shown in FIG. 8a, each of the releasable fastener sections is configured in a different shape, enabling the child to compare and contrast the shapes as the tag portions are manipulated. Although the shape tablet activity means is shown with various geometric forms (triangle, square, circle, and rectangle, etc.) any shape or size of releasable fastener may be employed. Manipulation of the shape tablet by the child enhances his ability to identify basic shapes.

Figure 9A:
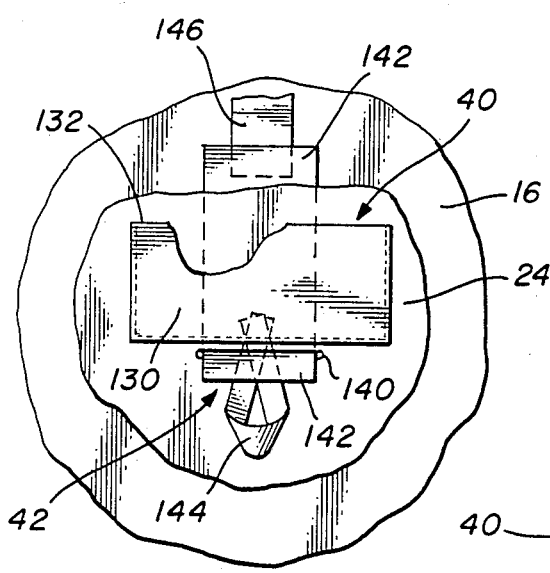
FIG. 9a is a magnified view in detail of the pocket activity means of FIG. 1 with the pull down activity means in a relaxed position.
Figure 9B:
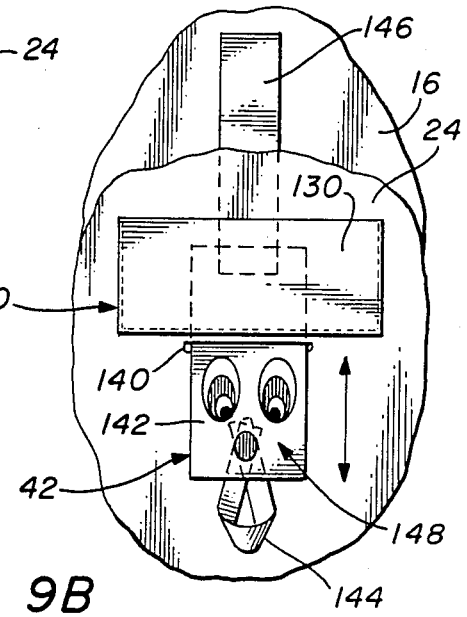
FIG. 9b is a magnified view in detail of the pull down activity means of FIG. 9a in an extended position.

The pocket activity means 40 is shown in greater detail in FIGS. 9a and 9b and includes pocket 130 attached to the activity pad along three edges and includes an open upper edge 132. Various articles (not shown) may be inserted, stored and retrieved from the pocket, such as small toys, food, etc. Manipulation of the pocket activity means by the child is reinforced by various rewards (objects) that may be located in the pocket by the adult.

The pull down activity means 42 is also shown in greater detail in FIGS. 9a and 9b and includes opening 140 in the activity pad. Pull down tab 142 is located within the opening and includes loop 144 on one end forming a handle. The pull down tab is attached at another end to an elastic band 146, which is in turn mounted on the base of the bib beneath the activity pad. Indicia 148 (not shown in FIG. 9a), such as a picture of a face may be applied to the outwardly facing side of the pull down tab, but is normally hidden behind the activity pad when the elastic band is in a relaxed state. The loop 144 may be manually grasped and the pull down tab extended through the opening so as to expose the indicia. Upon release of the loop, the elastic band automatically retracts the pull down tab into the opening. Although the pull down activity means is illustrated as partially beneath the pocket activity means, it is recognized that the pull down activity means may be independently located anywhere on the activity pad. Manipulation of the pull down activity means by the child increases his awareness of cause and effect and improves eye-hand coordination.

Although the invention has been disclosed above, with regard to particular and preferred embodiments, these are advanced for illustrative purposes only, and are not intended to limit the scope of this invention. For instance, the activity bib of this invention could be integrally incorporated into an article of clothing, such as a T-shirt or jacket. Further, one or more of the various activity means could be constructed so as to be independently removable and reattachable with respect to the activity bib, if desired. These variations remain within the invention as claimed below.

What is claimed is:

1. An activity bib for use by an adult in conjunction with a child, comprising:
   (a) a base having a front and a back and being adapted for placement on the torso of the adult;
   (b) means for releasably securing said base to the torso of the adult with said front side facing outwards;
   (c) one or more activity means mounted on said face side of said base for interaction with the child while in proximity to the adult wherein said at least one activity means comprises color slide activity means including a strap mounted at either end of said face side of said base and a loop slidingly constrained on said strap and shiftable between a first and a second position on said strap.

2. The activity bib of claim 1, wherein said strap is divided into segments, each of said strap segments including a loop slidingly constrained thereon.

3. The activity bib of claim 2 wherein said plurality of loops are each colored a different color.

4. An activity bib for use by an adult in conjunction with a child, comprising:
   (a) a base having a front and a back and being adapted for placement on the torso of the adult;
   (b) means for releasably securing said base to the torso of the adult with said front side facing outwards;
   (c) one or more activity means mounted on said face side of said base for interaction with the child while in proximity to the adult wherein said activity means comprises a pocket activity means attached to said face side of said base.

5. An activity bib for use by an adult in conjunction with a child, comprising:
   (a) a base having a front and a back and being adapted for placement on the torso of the adult;
   (b) means for releasably securing said base to the torso of the adult with said front side facing outwards;
   (c) one or more activity means mounted on said face side of said base for interaction with the child while in proximity to the adult wherein said activity means comprises pull down activity means including a pull down tab resiliently attached at first end to said base and including a second end adapted for manual manipulation, said pull down tab when in a relaxed position extending through an opening in an activity pad mounted on said face side of said base, said pull down tab being extendable to an exposed position exteriorly of said activity pad.

6. The activity bib of claim 5, wherein said pull down tab includes outwardly facing indicia exteriorly visible when said tab is in said exposed position.

7. An activity bib for use by an adult in conjunction with a child, comprising:
   (a) a base having a front and a back and being adapted for placement on the torso of the adult;
   (b) means for releasably securing said base to the torso of the adult with said front side facing outwards;
   (c) one or more activity means mounted on said face side of said base interaction with the child while in proximity to the adult wherein said activity means comprises digit door activity means including an opening in said base and a flap connected along one edge to said base adjacent to said opening, said flap being movable between an open position exposing said opening and a closed position covering said opening.

8. An activity bib for use by an adult in conjunction with a child, comprising:
   (a) a base having a front and a back and being adapted for placement on the torso of the adult;
   (b) means for releasably securing said base to the torso of the adult with said front side facing outwards;
   (c) one or more activity means mounted on said face side of said base of interaction with the child while in proximity to the adult wherein said activity means comprises texture center activity means having one or more overlays mounted on said base, each of said at least one overlays having a slot and a layer of material beneath said overlay and exposed in said slot, said layer of material having a texture different than the texture of said base.

9. An activity bib for use by an adult in conjunction with a child, comprising;
   (a) a base having a front and a back and being adapted for placement on the torso of the adult;
   (b) means for releasably securing said base to the torso of the adult with said front side facing outwards;
   (c) one or more activity means mounted on said face side of said base for interaction with the child while in proximity to the adult wherein said activity means comprises shape tablet activity means including a tablet mounted on said activity pad and includdling a portion rotatable between first and second positions and further comprising releaseable fastener means each having a different shape for securing said portion in either of said first or second positions.

10. The activity bib of claim 9, wherein said releasable fastener means are not mutually co-extensive.

* * * * *